June 10, 1924.  J. D. BASS  1,497,534
FIRE ESCAPE
Filed Feb. 5, 1923
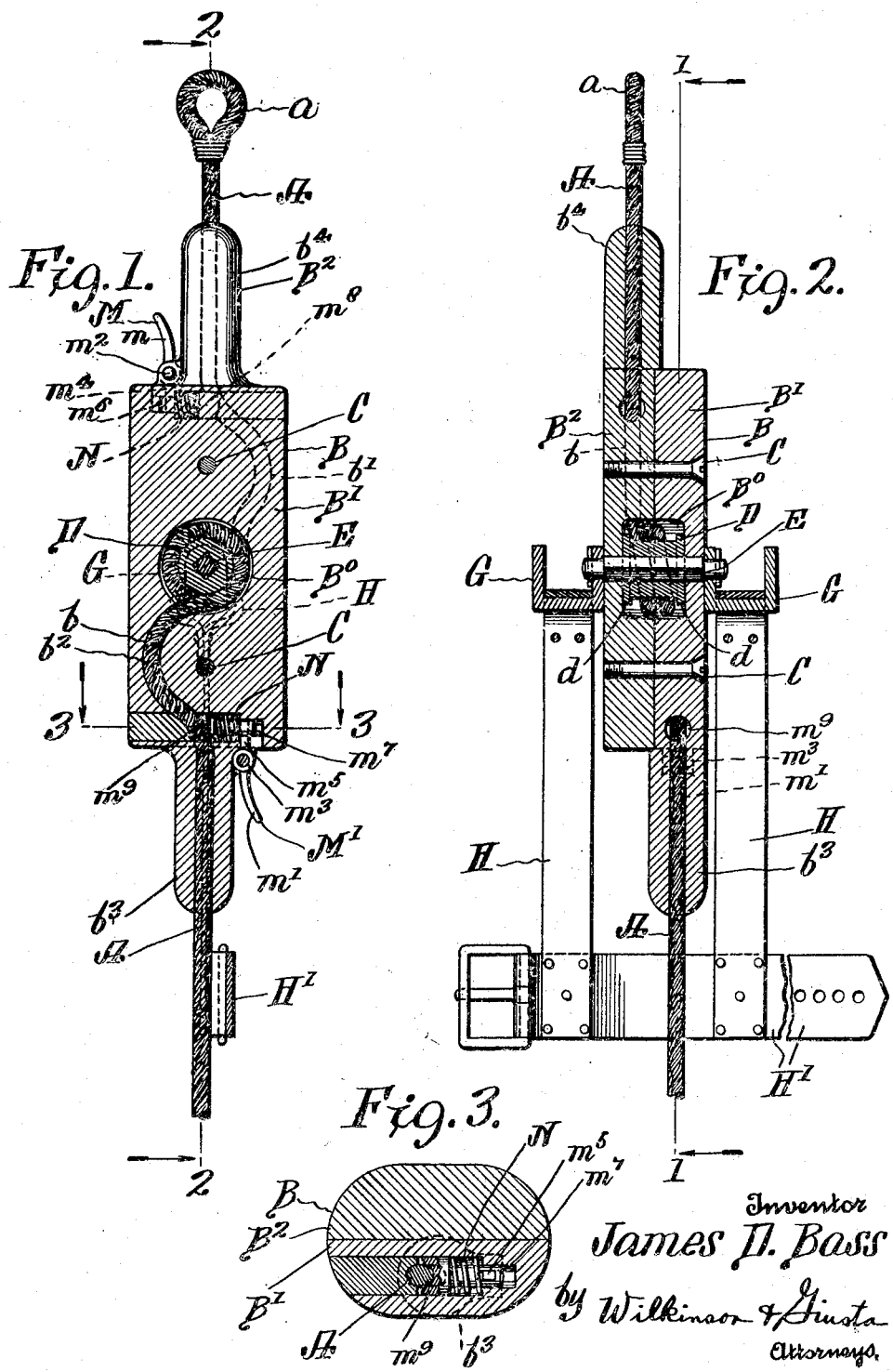

Patented June 10, 1924.

1,497,534

UNITED STATES PATENT OFFICE.

JAMES DANIEL BASS, OF PETERSBURG, VIRGINIA.

FIRE ESCAPE.

Application filed February 5, 1923. Serial No. 617,128.

*To all whom it may concern:*

Be it known that I, JAMES DANIEL BASS, a citizen of the United States, residing at Petersburg, in the county of Dinwiddie and State of Virginia, have invented certain new and useful Improvements in Fire Escapes, of which the following is a specification.

My invention relates to improvements in apparatus for facilitating the escape of persons imprisoned by fire, and it consists in providing a special attachment by which the person in danger may conveniently and safely lower himself or herself from the upper stories of a building to a place of safety.

The invention comprises more especially the combination with a line fastened near the point of safety and leading downwards, of a lowering device mounted on said line, with means for controlling the same by hand, and a harness attached to said lowering device adapted to go around the body of the user beneath the shoulders and support the same, leaving the user's hands free to control the device.

My invention will be more fully understood after reference to the accompanying drawings, in which like parts are indicated by similar reference symbols throughout the several views, and in which:—

Figure 1 is a sectional elevation of the apparatus omitting the harness, the section being taken along the line 1—1 of Figure 2;

Figure 2 shows a section along the line 2—2 of Fig. 1, with the harness in the disengaged or open position, and Figure 3 shows a section along the line 3—3 of Fig. 1, and looking down.

A represents the safety rope which is provided with the eye $a$ adapted to engage a hook or other fastening means, not shown, and the said line should be long enough to reach or nearly reach the ground.

B represents a housing block through which the line is rove, and to which the harness is connected. This housing block consists of two separable members B' and B² connected together in any convenient way, as by the screw bolts C.

The two members B' and B² are provided as at $b^3$ and $b^4$ with reduced portions forming handles, to be gripped by the operator, as will be hereinafter described. The housing block is provided with a central chamber B° which is preferably circular in transverse cross section. The block is provided with a longitudinal curved passage $b$ through which the rope A passes. This curved passage has rounded engaging shoulders $b'$ and $b^2$ above and below the central chamber B°, respectively.

Mounted in the central chamber B° is the friction block D, which is preferably in the form of a spool fast on the pin E, which is held against turning in the housing B. This block D is preferably flanged, as at $d$, so as to guide the rope towards the center thereof, and the rope takes one or more turns around the block, but a single turn is preferable.

Pivoted to the pin E on opposite sides of the housing B are two brackets G. Attached to these brackets are the straps H to which the belt H' is connected, as shown most clearly in Fig. 2. This belt is shown open in said figure, but when in use would obviously pass around the body of the wearer beneath the shoulders and would be securely buckled to the wearer.

In order to prevent the party escaping from descending too rapidly, I provide brakes which are normally pressed into engagement by springs, but which may be released by hand if desired, or the action of the springs may be supplemented or increased by hand, if desired.

M represents the brake operating at the upper end of the housing B (see Fig. 1), and M' represents the brake operating at the lower end of the housing. These brakes are in the form of reversely disposed hand levers $m$ and $m'$ pivoted to the housing B, respectively, at $m^2$ and $m^3$, and having their engaging ends $m^4$ and $m^5$ connected to the plungers $m^6$ and $m^7$ carrying the brake shoes $m^8$ and $m^9$, which shoes are normally pressed inwards to engage the rope A by suitable springs N. The upper and lower ends of the housing B are provided with reduced portion $b^3$ and $b^4$ (see Fig. 2), which serve as hand grips, and the escaping party can conveniently grip one of these with each hand and simultaneously control one or both of the brake levers, as desired.

Special attention is called to the positive action of the brakes. The instant a person is suspended by the device, his or her weight will immediately cause a complete lock of the brake, the heavier the weight suspended, the tighter will be the pull on the rope, and the more firmly will the brakes be applied.

For example, the upward movement of the rope through the curved channel pulls the brake shoe on the rope. This action combined with the continuous pressure of the brake spring that is ever pressing the shoe on the rope, causes a bind of the rope throughout the curved channel, thus effecting a bind of the rope wound around the spool thereby, affording a complete lock of the brakes.

Anyone, even a delicate person or a child, may operate the brake levers by gently pressing in on the handles.

The operation of the device is as follows: The eye $a$ being secured to the windowsill, or other convenient fixed object, not shown, the housing block B and the parts carried thereby, together with the safety rope A being stored away in the room from which the escape is to be made, the escaping party throws the free end of the rope out of the window, puts on the belt and steps out of the window and becomes suspended in the air by the harness referred to. The brakes will prevent the housing block from descending, and if while descending the user wishes to make more speed he presses in one or both of the brake levers, releasing one or both of the brakes and speeding up his descent.

If he wishes to stop, by relieving the pressure on the brake handle, the device will immediately stop.

It will be noted that the rounded shoulders $b'$ and $b^2$ will afford frictional surfaces against which the rope will bind, and friction will be still further increased by the application of the brake.

It is intended that the springs N shall be sufficiently strong to positively set the brake and thus prevent dangerous speed to the party descending. The binding effect of the rope in paying out would also be increased by pulling by hand downward on the rope below the housing B, thus enhancing the braking effect of the brake spool D.

While I have shown an embodiment of the invention in the preferred form, it will be obvious that various modifications might be made in the apparatus, and various changes made in the construction, combination and arrangement of parts which could be used without departing from the spirit of my invention; and I do not mean to limit the invention to such details except as particularly pointed out in the claims.

I claim as my invention:

1. A fire escape comprising a block having an internal chamber and substantially S-shaped passages leading upwardly and downwardly from said chamber, handles above and below the block having openings connecting with said passages, means attached to the block for supporting a person in position to grasp both the handles, a drum mounted fixedly in said chamber, a cable rove about the drum and extending through said S-shaped passages and the openings in the handles, brake shoes movably mounted in the block adjacent the handles, strong springs in the block normally acting on the brake shoes to bind the cable tightly against the walls of the passages to avoid movement of the block along the cable, and releasing means coupled to said brake shoes and extending alongside the handles in position to be grasped by the hands of the person in the act of holding to the handles whereby to ease the brake shoes away from the cable only during pressure of the hands on said means.

2. A fire escape comprising a block in two longitudinal parts with a central chamber and tortuous passages extending above and below the chamber and exposed on the separation of the parts, a hollow handle projecting above and below the block in connection interiorly with the passages, a drum fixed against rotation in said chamber, a cable rove round said drum and lying through the tortuous passages and hollow handles, means for supporting a person from the block in position to grasp both handles, a brake shoe in each passage placed to bind the cable at curved parts thereof, strong springs behind the brake shoes normally tending to hold the block against sliding down the cable without attention of the person, and levers coupled to said brake shoes and lying alongside said handles to be grasped and squeezed against the handles in the act of holding to the handles whereby to diminish and release the pressure of the shoes on the cables.

JAMES DANIEL BASS.